(No Model.)  2 Sheets—Sheet 1.

S. TYNES.
COTTON BUNCHER.

No. 316,923.  Patented Apr. 28, 1885.

WITNESSES

INVENTOR
Samuel Tynes,
by A. G. Heylmun,
Attorney.

(No Model.) 2 Sheets—Sheet 2.

S. TYNES.
COTTON BUNCHER.

No. 316,923. Patented Apr. 28, 1885.

WITNESSES
F. M. Burnham
E. T. Pritchard

INVENTOR
Samuel Tynes
by A. G. Hrylmun,
Attorney.

UNITED STATES PATENT OFFICE.

SAMUEL TYNES, OF NACOGDOCHES, TEXAS.

COTTON-BUNCHER.

SPECIFICATION forming part of Letters Patent No. 316,923, dated April 28, 1885.

Application filed January 26, 1885. (No model.)

*To all whom it may concern:*

Be it known that I, SAMUEL TYNES, a citizen of the United States of America, residing at Nacogdoches, in the county of Nacogdoches and State of Texas, have invented new and useful Improvements in Implements for Thinning and Bunching Cotton Plants, of which the following is a specification.

My invention has relation to improvements in implements for thinning and bunching young cotton plants; and the object is to provide an implement of the kind named which is of cheap and simple construction, and which will accomplish the end intended with certainty and in a satisfactory manner.

My invention consists in the novel construction and combination of parts, as will be hereinafter more fully described, and specifically pointed out in the claims.

Figure 1:
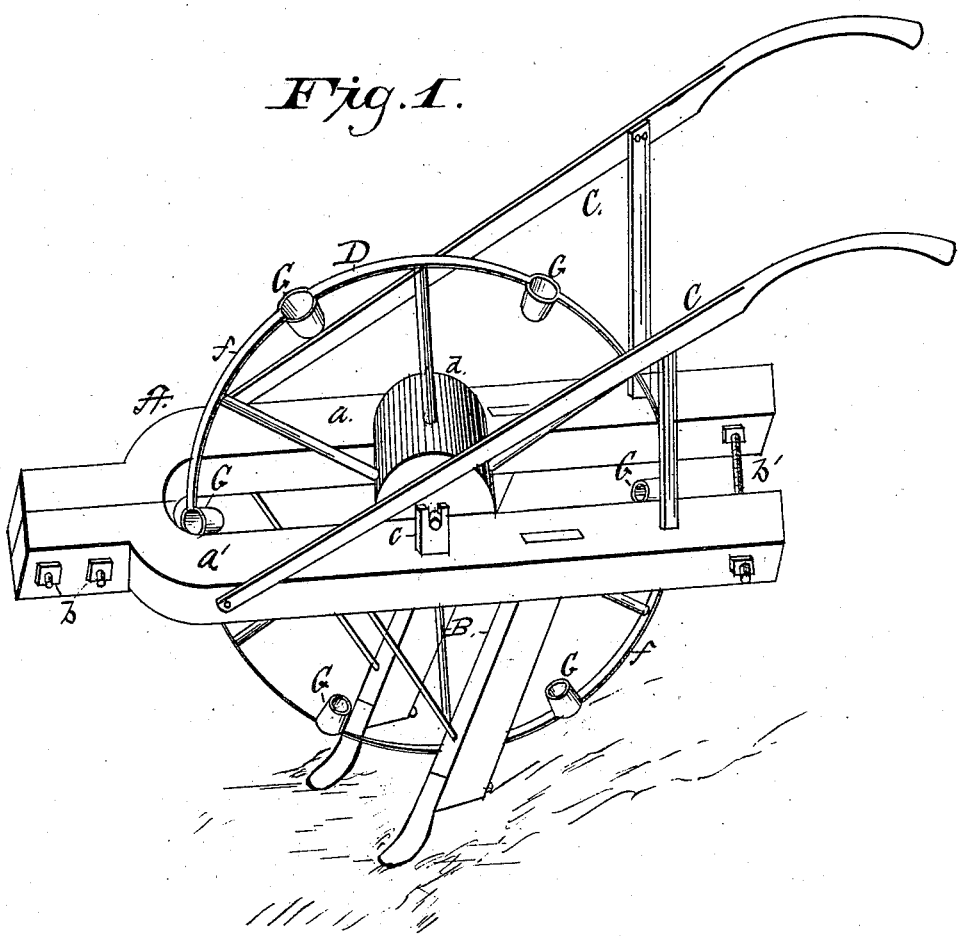
Figure 2:
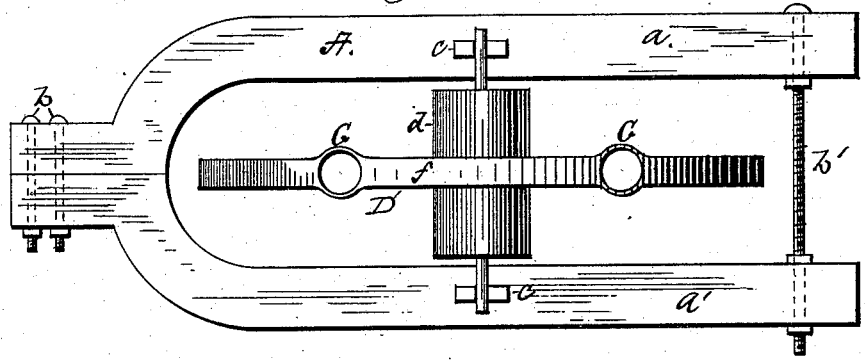
Figure 3:
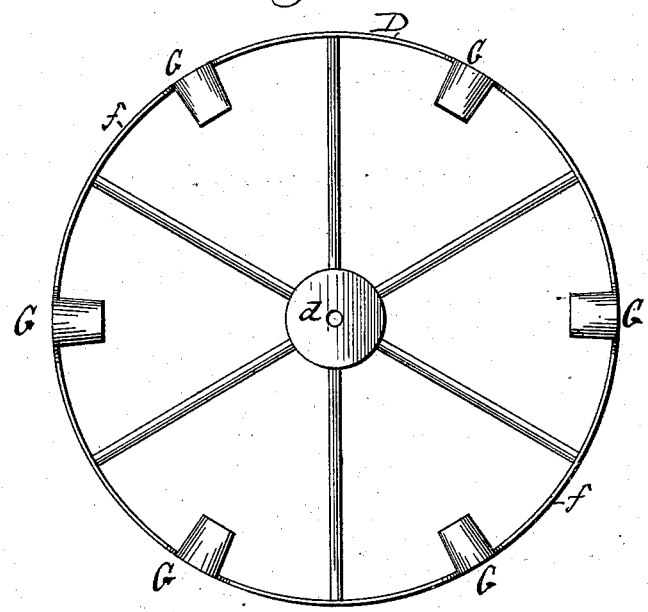

In the accompanying drawings, illustrating my improvements and forming a part of this specification, Figure 1 is a perspective view of the completed implement. Fig. 2 is a top view thereof. Fig. 3 is a side view of the wheel and hollow cylinders.

The letter A designates a frame, made of substantial strength, of any desired material, comprised of two side pieces, $a$ $a'$, adjustably united by threaded bars or cross-pieces $b$ $b'$.

The letter B designates the plow-standards, mortised in the side pieces of the frame, and arranged so that the points of the plow shall project forward of a vertical line drawn through the axle of the bunching-wheel. The plow-standards are properly braced, substantially as shown. Handles C are fixed to the frame by any convenient means and are of any convenient build. Fixed to the frame, about midway of its length and somewhat to the rear of the plow-points, are journal-bearings $c$, in which the shaft of the bunching-wheel rests.

The letter D designates the bunching-wheel, comprised of the hub $d$, having journals fitted to the bearings on the frame, radial arms fixed in the hub, as shown, and a tire or rim, $f$, secured to the arms. This tire or rim $f$ has formed therein a multiple of hollow cylinders, G, arranged midway between the points of intersection of the arms with the rim of the wheel. These bunching-cylinders are preferably made somewhat tapering toward their free end and are open at both ends. They are made integral with the rim, and may be set therein at any distance apart when making the wheel, according to the distance proposed to have the plants stand apart. By placing the hollow cylinders in the tire intermediate between the arms of the wheel, instead of making them as cup-terminals of the arms, I am enabled to make them without bottoms, and hence better to preserve the integrity of the plants bunched by them, since the tops of the plants can project through the open ends of the hollow cylinders and not be broken or crushed, as happens when cups are used.

The plows pass on each side of the rows and cover up all the plants except those protected by the walls of the hollow cylinders, and the labor of straightening the plants is much less than when an implement is used having a wheel provided with cups having bottoms. The contact of the rim of the wheel on the ground revolves the wheel as the implement is drawn forward.

What I claim as my invention, and desire to secure by Letters Patent, is—

1. The cotton-bunching wheel herein described, consisting of a hub provided with radial arms, and a circumferential ring or tire, formed or provided with a multiple of hollow cylinders open at both ends and arranged in the tire between the arms, substantially as described.

2. The frame comprised of adjustable side pieces and provided with plows, in combination with a bunching-wheel journaled on the frame back of the plow-point, and comprised of a hub with arms having secured to them a circumferential tire or rim, formed with hollow cylinders open at both ends and arranged in the tire between the terminals of the arm of the wheel, substantially as described, and for the purpose stated.

In witness whereof I have hereunto signed my name in the presence of two attesting witnesses.

SAMUEL TYNES.

Attest:
GEO. F. INGRAHAM,
TOM R. JENNINGS.